United States Patent [19]

Heritier et al.

[11] 4,167,040

[45] Sep. 4, 1979

[54] TAXIMETER INDICATING DEVICES

[75] Inventors: Francis R. Heritier, London; Christopher W. Iles, Newton Ferrers, both of England

[73] Assignee: Plessey Handel und Investments AG, Zug, Switzerland

[21] Appl. No.: 750,915

[22] Filed: Dec. 15, 1976

[30] Foreign Application Priority Data

Dec. 15, 1975 [GB] United Kingdom ............... 51294/75

[51] Int. Cl.² .............................................. G07B 13/04
[52] U.S. Cl. ................................... 364/900; 364/200; 235/30 R; 235/92 TC; 364/467
[58] Field of Search ... 364/900 MS File, 200 MS File, 364/900, 200, 768; 235/30 R, 45, 168, 92 TC

[56] References Cited

U.S. PATENT DOCUMENTS

| | | |
|---|---|---|
| 3,764,782 | 10/1973 | Spauszus et al. ............... 235/92 TC |
| 3,860,806 | 1/1975 | Fichter et al. ..................... 235/168 |
| 3,860,807 | 1/1975 | Fichter et al. ..................... 235/168 |
| 3,931,508 | 1/1976 | Kelch ................................ 235/168 |
| 3,937,933 | 2/1976 | Warkentin ....................... 235/150.3 |
| 3,953,720 | 4/1976 | Kelch ................................ 235/168 |
| 3,970,827 | 7/1976 | Ikuta et al. ..................... 235/92 TC |
| 3,983,378 | 9/1976 | Tammi .......................... 235/151.32 |

*Primary Examiner*—Gareth D. Shaw
*Assistant Examiner*—C. T. Bartz
*Attorney, Agent, or Firm*—Fleit & Jacobson

[57] ABSTRACT

A charge indicating device especially in the form of a taximeter is provided which makes use of microprocessor techniques for carrying out the required computations and which is provided with storage means for storing the details on which the computation is based. In a preferred form a taximeter is constructed using L.S.I. semiconductor techniques.

44 Claims, 4 Drawing Figures

TAXIMETER INDICATING DEVICES

This invention relates to indicating devices and relates more especially to charge indicating devices such as taximeters.

Taximeters as used on taxis are required to perform two main functions. These are to compute and display the fare to be paid by a hirer in accordance with a fare charge rate or tariff that is in force at the time and to accumulate a number of totals to enable the taxi owner to be able to supervise the operation of the taxi and its income.

The basis on which the fare is computed is determined in accordance with a number of arbitrary rules which reflect both local legislation and custom relating to the use of taximeters and the taximeter has therefore to be programmable to carry out the computation according to the rules in force in the area in which it is to be used.

For various reasons it is an important requirement that the fare or tariff structure should be updated quickly. In known taximeters updating of the fare structure is generally carried out by the removal and replacement of the gear trains in mechanical instruments or by the use of a read only memory (ROM), a programmable read only memory (PROM) or wiring fields in electronic instruments, these devices being removed from the taximeter and re-programmed or replaced with units that have already been re-programmed. In general this means opening the case or at least a cavity within the case which contains the fare structure memory. The situation is often further complicated by the fact that changes in fare or tariff structures are required to be effected by some regulating body such as the public carriage office in Great Britian.

The present invention is concerned with an indicating device, especially in the form of a taximeter which makes use of micro-processor techniques and which lends itself to being updated with a different fare structure without physical parts of the taximeter being removed, thus overcoming the need to open the case of the taximeter.

According to the present invention there is provided a charge indicating device comprising processing means, storage means operable under the control of the processing means for storing information relating to a charge structure in accordance with which a charge to be made is derived, and means for changing the information of said charge structure without removing any part of the storage means from said device.

In a preferred form of the invention the charge indicating device will be in the form of a taximeter, in which a charge to be made is derived in accordance with tariff structure information stored in the storage means.

In carrying out the invention according to the preferred form, it may be arranged that the storage means comprises a read/write store conveniently in the form of a random access memory.

The random access memory may be of non-volatile form or alternatively be of volatile form and have associated with it an auxiliary store of non-volatile form.

In such an arrangement the auxiliary store may be of metal-nitride-oxide-silicon (MNOS) form or may be of complementary-metal-oxide-silicon (CMOS) form, and have associated with it power supply means. The power supply means may comprise a battery, the battery conveniently taking the form of a rechargeable nickel cadmium battery in which event the power supply means may further comprise voltage limiting means to limit the battery charging voltage.

In one form of taximeter according to the preferred form of the invention, data input means will be provided for writing information into the storage means and also data output means may be provided for reading out information from the storage means.

In a preferred taximeter of this form the data input means and/or the data output means will each comprise an optical link, although it is envisaged that the data input means and/or the data output means may comprise an inductive, a capacitive, an acoustic or a direct electrical link.

In order to provide secure access to the taximeter according to the preferred form, the data input means may have associated with it an enabling code for data transfer purposes, the enabling code being stored in the storeage means. Additionally the taximeter may be provided with a serial number stored in the storage means, the enabling code and the serial number conveniently being related (preferably arbitrarily).

In order to provide for checking of the data, the information written into the storage means via the data input means may have a check-sum associated with it for information transfer checking purposes, the check sum conveniently being stored in the storage means. In such a taximeter an automatic checking facility may be incorporated, in which all or part of the information stored in the storage means is compared with one or more check sums stored therein for automatic checking purposes.

A taximeter according to the preferred form of the invention will be provided with display means, the display means conveniently comprising a fare charge indicator, an extras indicator, and preferably a tariff indicator.

Control means will be provided for controlling the operation of the taximeter, the control means conveniently comprising a plurality of push buttons, conveniently four, which are assigned the functions 'TEST', 'REVERSE/OFF', 'TARIFF SET' and 'EXTRAS SET' respectively.

In addition indicator means will be provided for indicating the state of operation of the taximeter, the indicator means conveniently comprising four indicators which are assigned the functions 'FOR HIRE', 'HIRED', 'STOPPED' and 'TO PAY' respectively.

In addition to its primary function the display means may be used to display information stored in the storage means for checking purposes, conveniently under the control of one or more push buttons, and advantageously by the successive operation of a single push button. In this respect the information stored in the storage means relating to the tariff structure may be displayed on the display means by means of the successive operation of the 'TEST' push button, the information being displayed on the display means being indicated in code form on the extras indicator and/or on the tariff indicator, and the information stored in the storage means relating to transient information e.g. fares charged etc. may be displayed on the display means by means of the successive operation of the 'EXTRAS SET' push button, the information being displayed being indicated in code form on the tariff indicator.

In order to effect loading of the taximeter with the tariff structure information, the taximeter may have associated with it loading means for loading the tariff structur information into the taximeter, the loading means conveniently comprising processing means, information storage means for storing information relating to tariff structure information applied to the processing means via data input means conveniently in the form of a keyboard device.

The information storage means may be arranged to store information relating to taximeter serial numbers to which the loading means is applicable and enabling codes corresponding to said serial numbers.

The loading means may also comprise a main loading device and an auxiliary loading device which is loaded with the tariff structure information from the main loading device and which is used to load the tariff structure information into a taximeter.

In accordance with a further aspect of the invention a method of loading a taximeter comprises the steps of loading a main loading device and using the main loading device to load a taximeter or alternatively the steps of loading a main loading device with tariff structure information, loading an auxiliary loading device with the tariff structure information from the main loading device and loading the tariff structure information from the auxiliary loading device into a taximeter.

An exemplary embodiment of the invention will now be described, reference being made to the accompanying drawings, in which.

In computing the fare to be charged during the hired period of a taxi, a taximeter uses as a basis a distance measurement and/or, when the speed of the taxi falls below a predetermined threshold, a time measurement. The distance measurement may be derived from a transducer circuit e.g. a proximity detector which affords a logic change, the duration between logic changes representing a defined increment of vehicle movement. The time measurement may be derived from a crystal oscillator.

The taximeter uses these distance and time increments to compute the fare to be charged in dependence upon a charge or fare structure or tariff that is in force at the time of the hiring. Typically, a taximeter may be required to have say four different tariffs any one of which may be selected. The tariffs may be used arbitrarily depending upon the custom and regulations of the area in which the taxi is operating. For example tariff 1 could be the tariff for one person in the taxi; tariff 2 for two persons; tariff 3 for three persons etc., or tariff 1 could be the normal day rate; tariff 2 the normal night rate; tariff 3 for journeys outside the taxis normal area of operation etc.

Each tariff is made up of a number of constants some or all of which will vary from tariff to tariff and typically these may be listed as follows:

(a) extras increment
(b) base cost per unit of distance and of time.
This may include a pre-charge
(c) surcharge cost per unit i.e. above a fare threshold
(d) increased fare threshold
(e) fare increment
(f) minimum speed threshold
(g) start of night tariff
(h) end of night tariff
(j) Unit/distance ratio It is currently the custom that some of these constants are made common to all of the tariffs and typically it is found that adeqate characterisation of four tariffs can be achieved by making all the constants apart from the pre-charge, the base unit cost and the surcharged unit cost constants common to all of the tariffs. Although the taximeter to be described will be assumed to be of this form, it should be appreciated that any number of the constants may be varied between the tariffs dependent upon the system complexity that can be tolerated.

The basic requirement of the taximeter is therefore to provide means for storing the constants that are common to all of the tariffs, to provide means whereby the individual tariffs may be defined by combination of the three constants that vary between tariffs, to provide computation means for computing the fare to be charged in dependence upon these constants and the basic distance and time pulses and to provide a display for displaying the computed fare.

Figure 1:
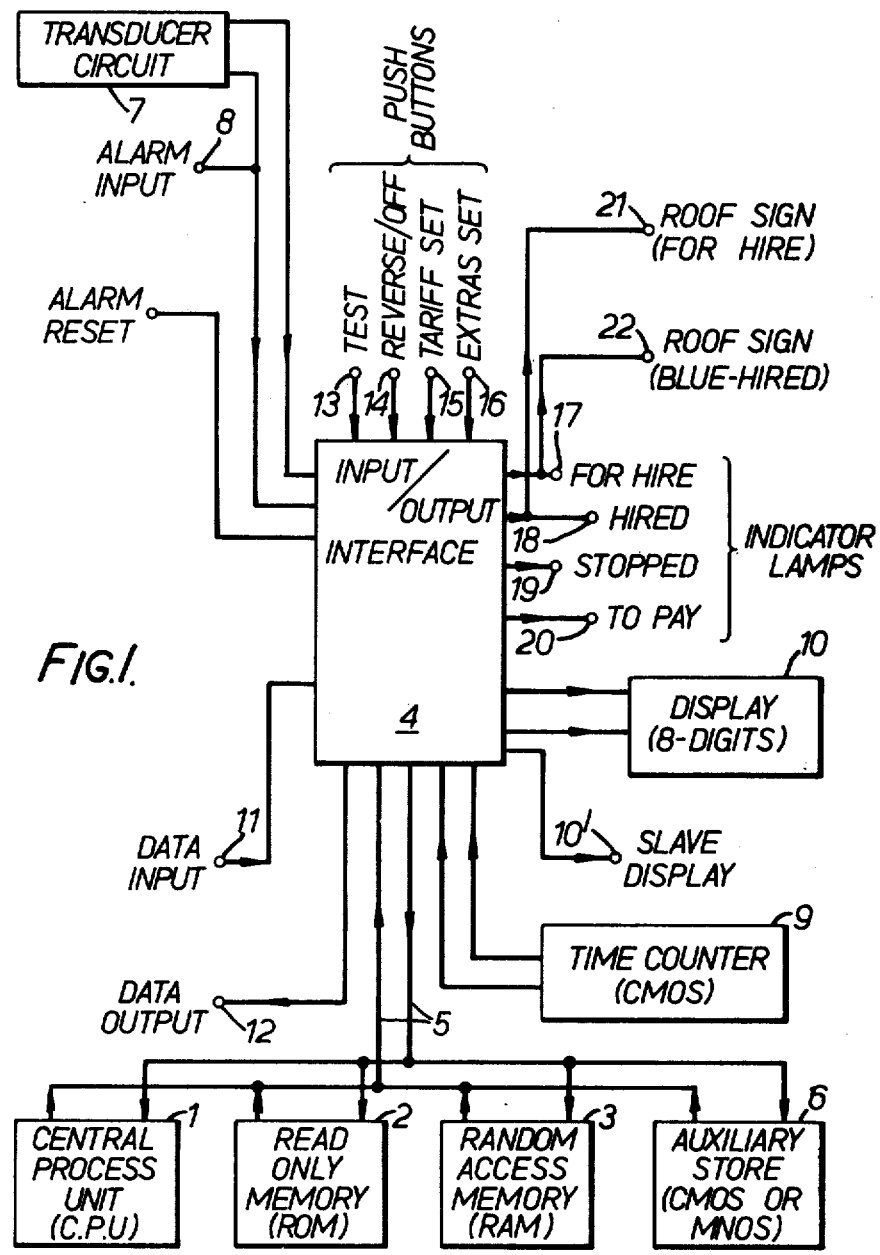
FIG. 1, is a block schematic diagram of a charge indicating device in accordance with the present invention in the form of a taximeter.

In FIG. 1 of the drawings there is shown in block schematic form an electronic taximeter in accordance with the present invention which lends itself to construction usng large scale integration (L.S.I.) semiconductor techniques. The taximeter shown consists of a micro-processor in the form of a central process unit (CPU) 1, a read-only memory (ROM) 2, a random access memory (RAM) 3, all of which are coupled to an input/output interface 4 by means of a common bus 5. The central process unit (CPU) 1 carries out all the required computation of the taximeter under the control of information contained in the ROM 2 and the RAM 3. The ROM 2 is used to store all the fixed information firstly relating to the programme in accordance with which the CPU 5 operates and secondly relating to the various fixed constants used in the computation of the fare to be charged. The RAM 3 is used to store all the transient information i.e. the information relating to the pre-charge, the base unit cost and the surcharged unit cost constants that vary from tariff to tariff and also information relating to varius accumulated totals e.g. the number of trips made, the number of unit clocked up, the total number of miles or kilometers covered, the engaged number of miles or kilometers covered, the extras total and the fares total. This latter information is usually required by the taxi owner to be able to supervise the operation of the taxi and its income.

Since it may be required that the information in the RAM 3 be stored for indefinite periods, it is preferable that it be of non-volatile form or alternatively be backed up by a non-volatile auxiliary store or dump 6 which may be of MNOS (metal nitride oxide silicon) form, but which may take the form of a CMOS (complimentary metal oxide silicon) store with a separate power supply e.g. a re-chargeable nickel cadmium battery. In this latter case it may be advantageous to provide the battery with voltage limiting means, conveniently including a zener diode for limiting the voltage of the battery during re-charging to prevent the battery venting gas which it is particularly prone to do at low temperatures.

The distance increments required by the taximeter in order to compute the fare to be charged takes the form of a transducer circuit 7 which is associated with some moving part e.g. wheel of the taxi. The transducer circuit 7 may take any convenient form e.g. a proximity detector but conveniently may take the form of the transducer arrangement that forms the basis of our copending Great Britain patent application No. 50995/75 and preferably affords an output indicative of the transducer having been tampered with as disclosed therein. The output afforded by the transducer circuit 7 together with an alarm input 8 are applied to the input/output interface 4 together with the output from a time counter 9, which is preferably of CMOS form and which affords the time increments which together with the distance increments are used by the CPU 1 in conjunction with the stored information to compute the fate to be charged. A visual indication of the fare computed by the CPU 1 is afforded by a display unit 10 which may typically comprise an 8-digit numerical display, each digit of which may conveniently consist of a seven segment LED (light emitting diode) element, five of the eight digits being used to indicate the fare to be charged in say pounds and pence, two of the digits being used to indicate the extras total and one digit being used to indicate the tariff in force at the time. Alternatively a liquid crystal display may be used. In addition to the display 10, an output 10' is provided for driving a slave display which may, for example, be placed in the passenger compartment of the taxi.

Information relating to the constants of each of the tariffs are normally determined by some regulating body such as the Public Carriage Office in Great Britain or an authorised agent and a data input 11 is provided whereby this information may be read-into the RAM 3. It is normally required that this input be sealed by the regulating body so that the information cannot be changed without their authority. In the present instance it is envisaged that this sealing be carried out electrically by arranging that each taximeter or a group of taximeters are afforded with code words which are known only to the regulating authority and which must be used to gain access to the RAM 3 and also, if required mechanically by using say a lead seal which may also be the seal used for ensuring that the taximeter is not opened by other than the regulating authority.

As well as providing the regulatory data input it may be necessary to provide the taxi owner with means for gaining access to the accumulated totals stored in the RAM 3 and it is envisaged that this may be done by making use of the display 8 as will be described with reference to FIG. 2 of the accompanying drawings, but also by providing a data output 12 from which the stored data is obtained either by operation of the taximeter controls (yet to be described) or by making use of the data input 11 again possibly making use of a code word for access purposes.

Day-to-day operation of the taximeter is effected by means of four push-buttons referenced 13, 14, 15 and 16 respectively, these being assigned the functions "test", "reverse/off", "tariff set" and "extras set" respectively, the use of which will be more fully explained with reference to FIG. 2 of the drawings, and the condition of the taximeter at any time is indicated by four lamps referenced 17, 18, 19 and 20 respectively which form an integral part of the taximeter, which indicate the conditions "For Hire", "Hired", "Stopped" and "To Pay" respectively, as will also be described more fully with reference to FIG. 2. Additionally the "For Hire" lamp 17 is provided with a parallel output 21 for connection to a "For Hire" roof sign and the "Hired" lamp 18 is provided with a parallel output 22 for connection to a blue "Hired" roof sign.

Figure 2:
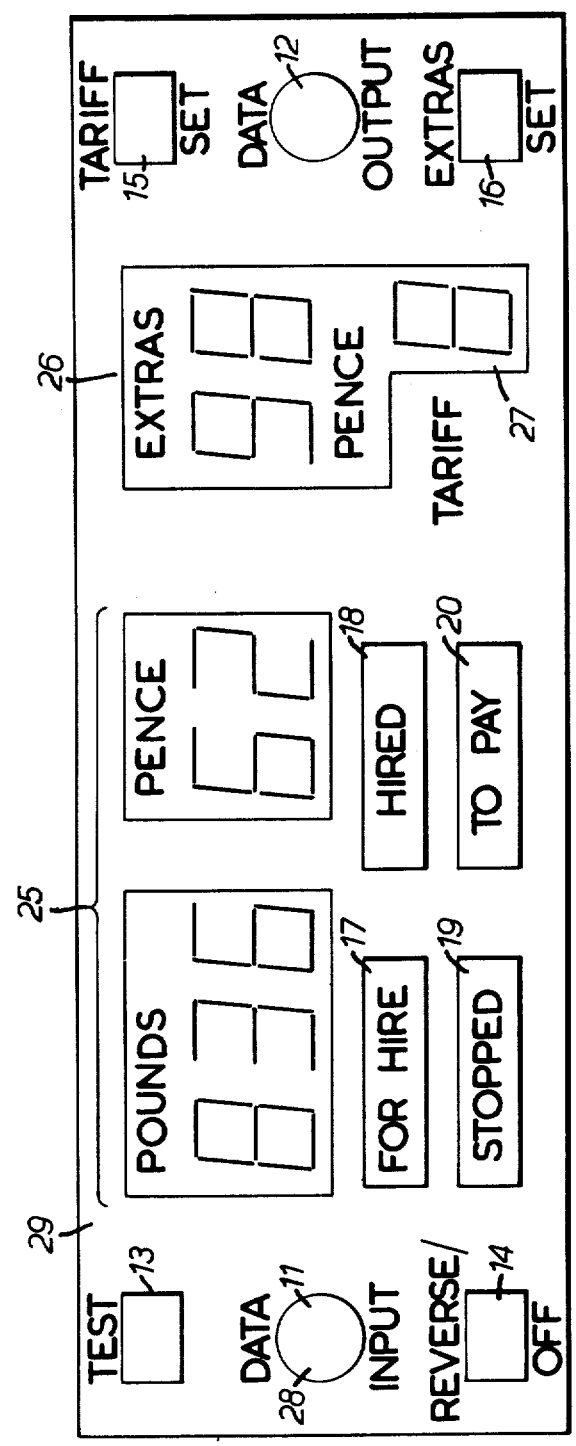
FIG. 2, is a somewhat diagrammatic view of a front panel of a taximeter of the form depicted in FIG. 1.

In FIG. 2 of the drawings there is depicted the front panel of a taximeter of the form described with reference to FIG. 1, this consisting of five digits 25 which form part of the display 8 of FIG. 1 and which are used to indicate the fare; two digits 26 which also form part of the display 8 of FIG. 1 and which indicate the "extras"; a single digit 27 which forms part of the display 8 of FIG. 1 and which indicates the selected tariff; the four lamps 17 to 20 of FIG. 1 which indicate when lit the "FOR HIRE", "HIRED", "STOPPED" and "TO PAY" conditions, respectively; the four push-buttons 13 to 16 of FIG. 1 for selecting the facilities "TEST", "REVERSE/OFF", "TARIFF SET" and "EXTRAS SET" respectively; the data input 11 of FIG. 1 and the DATA output 12 of FIG. 1.

In the taximeter depicted in FIG. 2, it is envisaged that the transfer of data to and from the meter would in a preferred form be carried out optically using, for example, optical fibre techniques, in which case it is envisaged that the data input 11 may take the form of an access hole 28 in the taximeter casing 29, the hole 28 providing access to a transparent window through which the input data may be passed via an optical link. As has been mentioned previously, in order to limit access to the regulatory data input to some regulating body or authorised agent, it is envisaged that the data input 11 may have associated with it a coded "word" which is unique to one or a small group of taximeters and which is known only to the regulating body or authorised agent so that unauthorised access thereto is impossible. In addition it is envisaged that the data input 11 be provided wih a mechanical e.g. lead seal which must be broken to gain access to the tubular member, in which case it may also be arranged that removal or movement of the seal so as to allow light to impinge the optical part of the data input 11 will cause an internal and/or external alarm to be activated.

Similarly it is envisaged tht the transfer of information via the data output 12 be carried out optically, again using a code "word" for access purposes.

It is considered that an appreciation of the operation and functions of the taximeter of FIG. 2 may best be explained by considering a typical operating sequence.

Before a taximeter may be used in a taxi it must, at least in G.B. be submitted to a regulating authority or authorised agency in order that it may be set up in accordance with the regulations and tariff structures in force in the area in which the taximeter is to be used. Typically, then the regulating authority will feed into the taximeter via the data input 11 the pre-charge, base unit cost and surcharged unit cost constants for each of the tarrifs that may be selected on the taximeter. The taximeter is then sealed and is ready for installation. It will be appreciated that this may be achieved in the taximeter thus far described without the need to open the taximeter casing by making use of the optical link affording the data input 11.

Assuming that the taximeter is installed on a taxi and that initially the accumulated totals stored in the RAM 3 of FIG. 1 are at zero, and the taximeter is in the 'OFF' condition with the time counter 8 of FIG. 1 running.

VEHICLE PLIES FOR HIRE

DRIVER PRESSES "TARIFF SET" ONCE:

"For hire" sign 17 lights (roof and meter).

Fare displays 35 are off.

Tarrif display 27 is off.

Extras display 26 is off.
VEHICLE IS HIRED
DRIVER PRESSES "TARRIF SET" PUSH BUTTON 15 TO SELECT APPROPRIATE CHOSEN TARIFF.
Driver presses "extras set" button 16 to increment extras total to required amount.
Vehicle moves off.
Preferably it should be arranged that the controls become inoperative once the vehicle starts moving and also preferably it should be arranged that the Tariff set push button 15 becomes inoperative whether the vehicle is moving or not until the TO PAY condition is reached.
Driver stops for toilet
Driver presses "tarrif set" push button 15 until "stop" is reached. "STOPPED"0 lamp 19 lights.
Optionally a single depression of the tariff set push button 15 may be arranged to set the state to "stop" without selecting intermediate tariffs.
Clock is made inoperative.
DRIVER RETURNS
Driver presses "reverse/off" push button 14.
Meter returns to previously selected tariff.
DESTINATION
Vehicle stops.
Driver presses "tariff set" push button 15.
State changes to "stop", "stopped" lamp 19 lights.
Option: driver presses "tariff set" push button:
  Extras added to fare total.
  Extras display 26 goes to zero.
"To pay" lamp 20 is lit up.

| Tariff Display 27 | Fares-Extras Display 25/26 |
|---|---|
| U | Units |
| H | Hired |
| R | Run |
| F | Fare |
| E | Extras |
| J | Journeys | etc. etc. for further depressions of the "extras set" push button 16.
VEHICLE GARAGED
Driver presses "Tariff set" push button 15.
Taximeter returns to normal "For Hire" state.
Driver presses "Reverse/Off" push button 14.
Taximeter goes to normal mode "OFF" state.
Note
When the vehicle has been in the "For Hire" mode without moving for a period of more than say 15 minutes, the unit can be arranged to automatically set itself to the "OFF" state. Further movement of the vehicle will automatically switch the unit back to the "For Hire" state.
When the meter is in the "For Hire" state and the vehicle is stationary for a period in excess of say half an hour or any other preset period the meter will automatically switch to a stand-by mode at which all the displays are turned off. Movement of the vehicle then automatically restores the unit to the "For Hire" mode.
These above described states i.e. 'normal', 'supervise' and 'off' are set out in sequence in the following Table.

| MODE | STATE | INDICATORS 17 18 19 20 | TARIFF DISPLAY 27 SHOWS | FARE DISPLAY 25 SHOWS | EXTRAS DISPLAY 26 SHOWS |
|---|---|---|---|---|---|
| NORMAL | FOR HIRE | ON - - - | OFF | | |
|  | DAY:- |  |  |  |  |
|  | HIRED | - ON - - | 1 | FARE | EXTRAS |
|  | TARIFF 2 | - ON - - | 2 | " | " |
|  | "3 | - ON - - | 3 | " | " |
|  | "4 | - ON - - | 4 | " | " |
|  | NIGHT- |  |  |  |  |
|  | HIRED | - ON - - | 6 | " | " |
|  | TARIFF 2 | - ON - - | 7 | " | " |
|  | "3 | - ON - - | 8 | " | " |
|  | "4 | - ON - - | 9 | " | " |
|  | STOPPED | - - ON - | | " | " |
|  | TO PAY OR FARE | - - - ON | | | |
| SUPERVISE | READ JOURNEYS | | | JOURNEYS | JOURNEYS |
|  | READ UNITS | ALL | | UNITS | UNITS |
|  | READ HIRED | FOUR | | HIRED | HIRED |
|  | READ RUN | FLASHING | | RUN | RUN |
|  | READ FARE | | | FARE | FARE |
|  | READ EXTRAS | | | EXTRAS | EXTRAS |
| OFF | OFF | ALL OFF | OFF | OFF | OFF |

DRIVER COLLECTS FARE
Driver presses "Tariff set" push button 15.
State goes to "For Hire".
AT END OF DAY
Driver presses "Extras set" push button 16. Taximeter switches to data read-out mode.
Taximeter shows total number of journeys on Fares 25 and Extras 26 display.
Tariff display 27 shows "J".
Other indicators flash
Successive depressions of "Extras set" push button 16 show:

In some areas it may be necessary for the taximeter to be provided with a 'check' facility which would enable an inspector or say a police officer to check that the taximeter was operating in accordance with the prevailing regulations, conditions, time of day etc. and this may be effected in the taximeter shown in FIG. 2 by making use of the "Test" button 13 when the taximeter is in the "For Hire" condition. Successive depression of the "Test" button 13 then causes the taximeter to go through a sequence of check modes making use of the 8-digit display. In this respect tariffs 1 to 4 may be assumed to be applicable to for example normal day rates and tariffs 6 to 9 applicable to, for example, night rates.

Typical check modes are shown in the following Table:

| MODE | STATE | INDICATORS 17 18 19 20 | TARIFF DISPLAY 27 SHOWS | FARE DISPLAY 25 SHOWS APPROPRIATE PARAMETER IN ALL CASES | EXTRAS DISPLAY 26 SHOWS |
|---|---|---|---|---|---|
| TARIFF CHECK 1 | PRECHARGE PRECHARGE RATE BASE RATE THRESHOLD POST THRESHOLD RATE EXTRAS | ALL FOUR FLASHING | 1 | | C1 C2 C3 C4 C5 C6 |
| TARIFF CHECK 2 | PRECHARGE PRECHARGE RATE BASE RATE THRESHOLD POST THRESHOLD RATE EXTRAS | ALL FOUR FLASHING | 2 | | C1 C2 C3 C4 C5 C6 |
| TARIFF CHECK 3 | PRECHARGE PRECHARGE RATE BASE RATE THRESHOLD POST THRESHOLD RATE EXTRAS | ALL FOUR FLASHING | 3 | | C1 C2 C3 C4 C5 C6 |
| TARIFF CHECK 4 | PRECHARGE PRECHARGE RATE BASE RATE THRESHOLD POST THRESHOLD RATE EXTRAS | ALL FOUR FLASHING | 4 | | C1 C2 C3 C4 C5 C6 |
| TARIFF CHECK 6 | PRECHARGE PRECHARGE RATE BASE RATE THRESHOLD POST THRESHOLD RATE EXTRAS | ALL FOUR FLASHING | 6 | | C1 C2 C3 C4 C5 C6 |
| TARIFF CHECK 7 | PRECHARGE PRECHARGE RATE BASE RATE THRESHOLD POST THRESHOLD RATE EXTRAS | ALL FOUR FLASHING | 7 | | C1 C2 C3 C4 C5 C6 |
| TARIFF CHECK 8 | PRECHARGE PRECHARGE RATE BASE RATE THRESHOLD POST THRESHOLD RATE EXTRAS | ALL FOUR FLASHING | 8 | | C1 C2 C3 C4 C5 C6 |
| TARIFF CHECK 9 | PRECHARGE PRECHARGE RATE BASE RATE THRESHOLD POST THRESHOLD RATE EXTRAS | ALL FOUR FLASHING | 9 | | C1 C2 C3 C4 C5 C6 |
| MODE | STATE | INDICATORS 17 18 19 20 | TARIFF DISPLAY 27 SHOWS | FARE DISPLAY 25 SHOWS | EXTRAS DISPLAY 26 SHOWS |
| BASE CHECKS | DISTANCE CHECK TIME CHECK SECTOR START SECTOR END SECTOR START SECTOR END THRESHOLD SPEED | | 0 | METERS HOURS AND MINUTES 24 HOUR CLOCK 4 DIGITS KPH or MPH | C1 C2 C3 C4 C5 C6 C8 |

Figure 3:
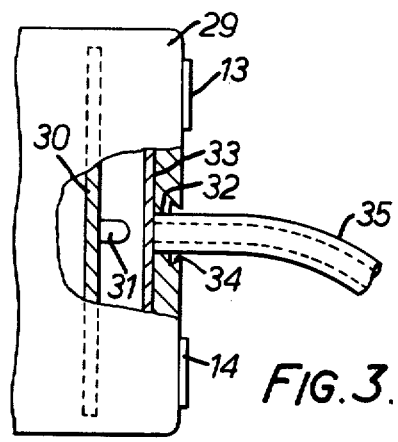
FIG. 3, is a fragmentary side view of the taximeter of FIG. 2.

In FIG. 3 of the drawings there is depicted a fragmentary side view of the taximeter of FIG. 2 cut-away to show the construction of the optical data input 11 of FIG. 2. In FIG. 3, the case 29 of the taximeter is shown with the push buttons 13 and 14 indicated as being slightly proud of its front surface. It will, of course, be appreciated that the push buttons 13 and 14 and the push buttons 15 and 16 could be flush with the taximeter front surface. Within the casing 29 of the taximeter is secured a printed wiring board 30 on which various components of the taximeter such as the 8-digit numerical display 8 (FIG. 1) are mounted and on which an optical receiver 31, typically in the form of a light detecting diode is also mounted. Access to the optical receiver 31 contained in the taximeter is obtained by means of an access hole 32 in the front surface of the casing 29, and through a transparent window 33 secured to the casing 29. The access hole 32 is provided with an undercut counterbore 34 in which a lead seal cover can be fitted if required. The size of the access hole 32 is made such that an optical probe 35 can be fitted into it for data transfer purposes. The optical probe 35 may contain a light emitting diode either within it or at the end remote from the taximeter.

It will be appreciated that the optical data output 12 of FIG. 2 may take a similar form to the data input described with reference to FIG. 3, except that in that case the optical receiver 32 would be replaced by an optical transmitter such as a light emitting diode (LED). In this case the probe 35 will contain or be associated with an optical detector for detecting the light emitted by the optical transmitter. In both cases intensity modulation of a light beam may be used for data transfer purposes.

As has already been mentioned, the taximeter described with reference to FIGS. 1 to 3 of the accompanying drawings may be loaded with tariff information via the optical data input 11 without the need for opening the taximeter case or of removing any part of the taximeter, except perhaps for the lead seal, if provided.

Figure 4:
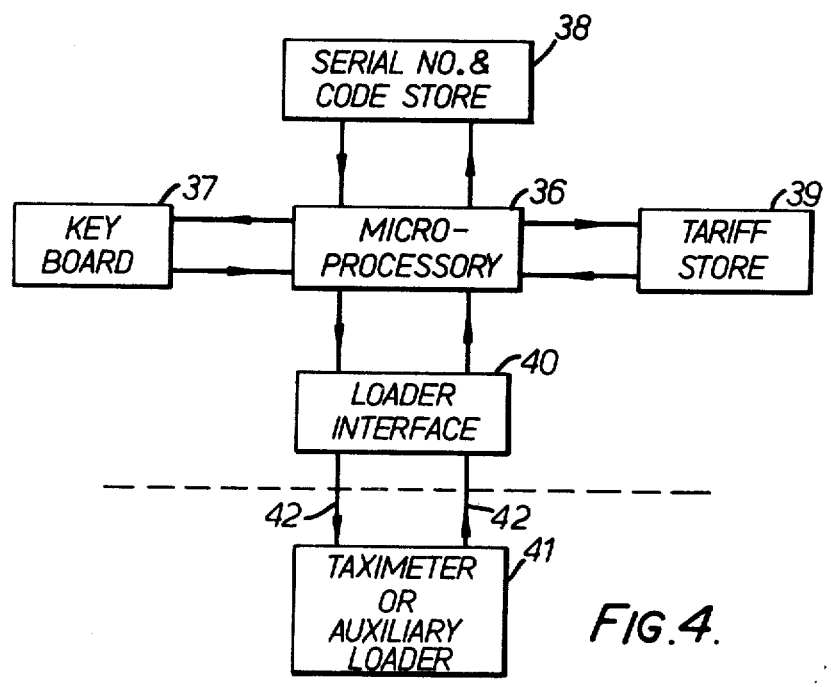
FIG. 4, is a block schematic diagram of a loading equipment for use with the taximeter of FIGS. 1 to 3.

It is envisaged that loading of the taximeters with the appropriate fare structures be carried out using a loading equipment which may take one of two forms dependent upon the number of taxis in a particular area. The normal arrangement for main metropolitan areas is to provide a main loading equipment a preferred form of which is shown in FIG. 4 of the accompanying drawings. This consists of a micro-processor 36 which is connected to a keyboard device 37 a serial number and code store 38, a tariff store 39, and a loader interface 40. The serial number and code store 38 is arranged to store the serial numbers of the taximeters with which it is proposed to operate, each serial number being associated with an enabling code number that is arbitrary and is kept secret from operators. The information regarding the tariff structures to be used are keyed into the tariff store 39 using the keyboard 37. The stored tariff information is then transferred to a taximeter 41 connected to it by means of two optical probes 42 via the loader interface 40. Operation of the main loading equipment shown in FIG. 4 is as follows:

The main loading equipment is connected to the taximeter 41 via the two optical links 42, data transfer being controlled by the taximeter and is initiated by depressing the 'TEST' push button 13 (FIGS. 1 and 2). The first byte of data information both from the loader to the taximeter and from the taximeter to the loader is used to correctly set up the links. The loader now interrogates the taximeter for its "built-in" serial number, which may conveniently be stored by means of a wiring field interrogated by the taximeter CPU 1 (FIG. 1) under program control. The interrogated serial number is then used in the loader to determine the corresponding enabling code stored in the serial number and code store 39 and control of data transfer is returned to the taximeter, and the data stream from the loader is requested bit-by-bit. The data stream is pre-fixed with the correct enabling code. The taximeter compares the incoming enabling code with the enabling code built into it, again conveniently in the form of a wiring field, and if a successful comparison is made the data transfer is allowed to proceed, the new data over-writing the corresponding information in the RAM 3 (FIG. 1). If the check on the enabling code fails, the taximeter stops the transfer of information and sets a 30 second delay program loop before it will accept another trial. This procedure prevents fraudulent corresponding information in the RAM 3 (FIG. 1). If the check on the enabling code fails, the taximeter stops the transfer of information and sets a 30 seconds delay program loop before it will accept another trial. This procedure prevents fraudulent attempts to transfer data by code counting through the enabling code sequence. An alternative to this system is to use two memory locations within the taximeter RAM, one of which is arranged to store a constant data from the other being read, incremented and re-written at each failure to transfer data. The value of the constant may be set to form a threshold to differentiate between technical failures and attempts to illegally transfer data into the instrument.

In order to avoid difficulties in loading tariffs in provincial areas where the number of vehicles does not justify the presence of a main loading equipment and also where it would be difficult to control the security of the codes used to control tariff updating, it is proposed that a portable auxiliary loading equipment be used. This equipment would comprise limited storage capacity to cope with a limited number of vehicles and is loaded with the appropriate tariff information from a main loading equipment as described with reference to FIG. 4. In this case the auxiliary loading equipment would be connected in place of the taximeter 41 and would be loaded and sealed and dispatched to the provincial area where it would be used to update taximeters in the locality in a similar manner to the main loading equipment.

In some taximeters it is required that a check be provided to check that the data transferred to it is correct and also for automatically carrying out a self-check operation to determine whether the stored information is correct and has not been multilated in any way. This may be achieved by any convenient method such as by the use of a check sum. In the simplest case this consists of adding together all of the constants of the data stream to give a number known as the check sum. The check sum is computed by the tariff loading equipment and is loaded into a location of the taximeter RAM with the rest of the data. Included in the taximeter ROM is a routine that enables the taximeter CPU to compute the check sum independently as the data is being transferred and to compare it with the check sum previously loaded into the RAM. If the stored check sum and the computed check sum differ, the data has been corrupted and the taximeter may be set to an alarm condition. Conveniently this may be signalled by an alarm lamp or by causing one or more of the existing displays to flash. There is a finite probability that two or more errors in a check sum may combine to provide a check sum that still compares true. The probability of this occurring may be reduced by introducing additional check sums on parts of the data stream.

For the purpose of law enforcement and policing it may be required that the check sum be made available on the display by means of the 'TEST' button along with the other checks that may be carried out as has already been described.

Further it may be arranged that more than one check sum be provided, a first check sum being associated, for example, with the charging data and a second check sum being associated with data preculiar to a particular vehicle. This will mean that in a locality where the same fare prevails the first check sum or sums will be the same in every taxi whilst the second check sum will be the same for same vehicle type as may be conveniently displayed on a plate affixed to the vehicle.

As will be appreciated the taximeter described with reference to FIGS. 1 to 4 of the accompanying drawings is subject to many optional features and not all those features described need necessarily be incorporated. In addition various parts of the taximeter may be changed from that described without departing from the scope of the invention.

For example, although the numerical display 8 has been described as including 7-segment LED devices, it should be appreciated that any convenient form of display may be used such as, for example, an electro-physical or electro-chemical display e.g. liquid crystal displays the transparency of which are used to modulate a light source either directly or via an optical fibre coupling. In some arrangements it may be desirable that a source of light external to the taximeter be used to provide the illumination of the display and conveniently ambient light sensing means may be provided to control the luminous intensity of the display means according to surrounding light conditions. Conveniently, if the data input 11 is not covered by a lead seal, the optical detector that forms part of it may be used to sense the ambient light to control the display illumination.

Also, although push-buttons 13 to 16 have been specified it should be appreciated that any convenient form of touch control e.g. proximity-resistive or capacitive or optical may be used, and in the case of an optical touch control where a light path is broken to affect operation of the control it may be arranged that the light detector is selective such as by causing the light beam to be modulated so as to ignore ambient light. Additionally, in some applications it may be convenient to provide delay means associated with each push or touch button to prevent corrupt system operation due to short duration multiple closures (contact bounce) and/or also to prevent accidental touch operation.

Although in the arrangement described, the transfer of data into and out of the taximeter is envisaged as being carried out optically, it should be appreciated that any convenient data transfer technique may be used such as inductive, capacitive, acoustic or direct electrical couplings.

In the taximeter described the memory function is effected by ROM 2, RAM 3 and auxiliary store 6. In some applications one or more of these functions may be combined dependent upon the type of construction used. In some applications ROM 2 may take the form of an electrically alterable ROM or some like device.

Under normal circumstances a taximeter would derive its operating power from a primary source (typically a vehicles battery). Because parts of the electronic taximeter are required to work even though the primary supply may become disconnected it is necessary to provide secondary batteries within the taximeter.

If such a secondary supply is provided the period of operation after disconnection from the primary supply is proportional to the current drain of all the circuits which are required to operate and which have to draw current from the secondary supply.

However, typically these circuits each have differing current demands and may be required to operate for different periods of time after disconnection of the supply. (For example, timekeeping means within the meter may be required only to work for periods of 24 to 36 hours during interruption of the primary supply for maintenance purposes, where as memory devices associated with storing supervisory totals may be required to operate for perhaps one or two months after the vehicle is involved in an accident.)

It is thus envisaged that a plurality of separate rechargeable battery supplies be provided each associated with particular circuits and isolated from one another by diode means such that when the primary supply is disconnected the current drain of circuits with requirements for short operating periods during primary supply disconnection do not drain the batteries associated with circuits having requirements for longer periods of operation during primary supply disconnection.

This considerably reduces the size of the battery required to support the system.

In order to provide the taximeter with the facility of charging tariffs at particular times of day or night, it is envisaged that a standard CMOS counter be used which is multistaged with the last 16 bits addressable by means of a 4 bit input to the part. As each bit is addressed in turn the state of that bit is made available on a single line.

The associated taximeter electronics stores binary numbers associated with times of day of tariff change.

The periods counter bits are compared with the store values bit at a time starting with the most significant bit. When the most significant bit compares true the scan steps to the next most significant digit and so on until the 16th most significant bit compares true, the system then has a true comparison with one of the previous stored values and makes the associated tariff adjustment. The processor can also store the value for 24.00 hrs midnight and at midnight the counter is reset to zero.

By arranging that a tariff changeover is effected at a particular time, it can happen that a tariff change is effected whilst a taxi is in the middle of a 'HIRED' period. This situation is unacceptable to some authorities and can be overcome by arranging that each time a 'FOR HIRE' condition is selected a comparison is made of the absolute time with a stored time to determine whether a preselected time has passed, and to effect the tariff change the first time the 'FOR HIRE' mode is selected after a preselected time has elapsed. In a similar manner it may be arranged that a different complete tariff structure be loaded into the taximeter so that the new tariff structure can be brought into operation at a preselected time or when a 'FOR HIRE' mode is selected following that time.

What we claim is:

1. A taximeter encased in a housing, said taximeter comprising processing means for carrying out computations to determine a charge, storage means for storing a plurality of constants constituting a tariff structure in accordance with which said charge to be made is derived, means for interconnecting said processing means and said storage means wherein said processing means controls the storage means to read the contents of said storage means into said processing means without destroying the contents of said storage means, and data transfer means interconnected with said processing means and storage means and operable under the control of the processing means and operative on the storage means for electronically changing the constants of said tariff structure stored in said storage means without removing any part of the storage means from within said housing.

2. A charge indicating device as claimed in claim 1 in the form of a taximeter, in which a charge to be made is derived in accordance with tariff structure information stored in the storage means.

3. A taximeter as claimed in claim 2, in which the storage means comprises a read/write store.

4. A taximeter as claimed in claim 3, in which the read/write store takes the form of a random access memory.

5. A taximeter as claimed in claim 4, in which the random access memory is of non-volatile form.

6. A taximeter as claimed in claim 4, in which the random access memory is of volatile form and has associated with it an auxiliary store of non-volatile form.

7. A taximeter as claimed in claim 6, in which the auxiliary store is of metal-nitride-oxide-silicon (MNOS) form.

8. A taximeter as claimed in claim 6, in which the auxiliary store is of complementary-metal-oxide-silicon (CMOS) form, which has associated with it power supply means.

9. A taximeter as claimed in claim 8, in which the power supply means comprises a battery.

10. A taximeter as claimed in claim 9, in which the battery is a rechargeable nickel cadmium battery.

11. A taximeter as claimed in claim 10, in which the power supply means further comprises voltage limiting means to limit the battery charging voltage.

12. A taximeter as claimed in claim 2 in which data output means is provided for reading out information from the storage means.

13. A taximeter as claimed in claim 12, in which the data output means comprises an optical link.

14. A taximeter as claimed in claim 12, in which the data output means is selected from the group consisting of an inductive, a capacitive, an acoustic, or a direct electrical link.

15. A taximeter as claimed in claim 2 in which display means is provided.

16. A taximeter as claimed in claim 15, in which the display means comprises a fare charge indicator and an extras indicator.

17. A taximeter as claimed in claim 15, in which the display means comprises a tariff indicator.

18. A taximeter as claimed in claim 16, in which the display means is used to display information stored in the storage means for checking purposes.

19. A taximeter as claimed in claim 18, in which the display means is used to display information stored in the storage means for checking purposes under the control of one or more push buttons.

20. A taximeter as claimed in claim 19, in which information stored in the storage means is displayed on the display means under the successive operation of a single push button.

21. A taximeter as claimed in claim 20, in which the information stored in the storage means relating to the tariff structure is displayed on the display means by means of the successive operation of the 'TEST' push button.

22. A taximeter as claimed in claim 21, in which the information being displayed on the display means is indicated in code form on the extras indicator and/or on the tariff indicator.

23. A taximeter as claimed in claim 20, in which information stored in the storage means relating to transient information e.g. fares charged are displayed on the display means by means of the successive operation of the 'EXTRAS SET' push button.

24. A taximeter as claimed in claim 23, in which the information being displayed is indicated in code form on the tariff indicator.

25. A taximeter as claimed in claim 2, having associated with it loading means for loading the tariff structure information into the taximeter.

26. A taximeter as claimed in claim 2, comprising control means for controlling the operation of the taximeter.

27. A taximeter as claimed in claim 26, in which the control means comprises a plurality of push buttons.

28. A taximeter as claimed in claim 27, having four push buttons which are assigned the functions 'TEST', 'REVERSE/OFF', 'TARIFF SET' and 'EXTRAS SET' respectively.

29. A taximeter as claimed in claim 2, comprising indicator means for indicating the state of operation of the taximeter.

30. A taximeter as claimed in claim 29, in which indicator means comprises four indicators which are assigned the functions 'FOR HIRE', 'HIRED', 'STOPPED' and 'TO PAY' respectively.

31. A taximeter as claimed in claim 2, in which the data transfer means comprises data input means for writing information into the storage means.

32. A taximeter as claimed in claim 31, in which the information written into the storage means via the data input means has a check-sum associated with it for information transfer checking purposes.

33. A taximeter as claimed in claim 32, in which the check sum is stored in the storage means.

34. A taximeter as claimed in claim 33, further comprising an automatic checking facility.

35. A taximeter as claimed in claim 34, in which all or part of the information stored in the storage means is compared with one or more check sums stored therein for automatic checking purposes.

36. A taximeter as claimed in claim 31, in which the data input means has associated with it an enabling code for data transfer purposes, the enabling code being stored in the storage means.

37. A taximeter as claimed in claim 36, in which the storage means has a serial number stored therein and in which the enabling code and the serial number are related.

38. A taximeter as claimed in claim 31, in which the data input means is selected from the group consisting of an inductive, a capacitive, an acoustic or a direct electrical link.

39. A taximeter as claimed in claim 31, in which the data input means comprises an optical link.

40. A taximeter as claimed in claim 31, in which the taximeter is provided with a serial number stored in the storage means.

41. A system comprising a taximeter and a loading means for use with a taximeter, said taximeter comprising first processing means, storage means for storing a plurality of constants constituting a tariff structure in accordance with which a charge to be made is derived, means for interconnecting said first processing means and said storage means wherein said first processing means controls the storage means, and data transfer means interconnected with said first processing means and storage means and operable under the control of said first processing means and operative on the storage means for electronically changing the information of said tariff structure stored in said storage means withou removing any part of the storage means from said device and in which a charge to be made is derived in accordance with tariff structure information stored in the storage means, said loading means comprising second processing means, information storage means for storing information relating to tariff structure information which is to be fed to said first processing means, connection means connecting the information storage means with the second processing means which is operative to control the information storage means, and interface means for connecting the second processing means to the said data transfer means of the taximeter.

42. A system as claimed in claim 39, in which the data transfer means comprises a keyboard device.

43. A system as claimed in claim 41, in which the information storage means is arranged to store information relating to taximeter serial numbers to which the loading means is applicable and enabling codes corresponding to said serial numbers.

44. A system as claimed in claim 41 and further comprising an auxiliary loading device means which is loaded with the tariff structure information for loading the tariff structure information into the taximeter.

* * * * *